United States Patent [19]
Steinmann et al.

[11] 3,727,348
[45] Apr. 17, 1973

[54] SAFETY ARRANGEMENT FOR POWERED VEHICLE WINDOWS, SUN-ROOFS AND THE LIKE

[75] Inventors: Helmut Steinmann, Baden-Baden; Karl Heinz Burger, Buhl, both of Germany

[73] Assignee: Robert Bosch GmbH, Stuttgart, Germany

[22] Filed: Apr. 10, 1972

[21] Appl. No.: 242,486

[30] Foreign Application Priority Data

June 2, 1971   Germany..................P 21 27 207.1

[52] U.S. Cl..............................49/28, 200/61.43
[51] Int. Cl..........................................E05g 11/38
[58] Field of Search..............................49/26–28; 200/61.43, 61.44, 61.71, 81, 81.9

[56] References Cited

UNITED STATES PATENTS

| | | | |
|---|---|---|---|
| 2,221,216 | 11/1940 | Greegor et al. | 49/27 X |
| 2,911,212 | 11/1959 | Förster | 49/28 |
| 3,260,812 | 7/1966 | Miller | 200/61.43 |
| 3,276,164 | 10/1966 | Hilfing et al. | 49/28 |
| 3,662,491 | 5/1972 | Boyriven | 49/28 |

FOREIGN PATENTS OR APPLICATIONS

735,324   8/1955   Great Britain..........................49/28

*Primary Examiner*—J. Karl Bell
*Attorney*—Michael S. Striker

[57] ABSTRACT

In a vehicle, a safety arrangement for powered windows, sun-roofs, and the like. A squeezable fluid conduit at least in part bounds an opening. A window or the like is movable by a motor in a direction closing the opening. A pump is connected with the fluid conduit and establishes a flow of fluid therethrough. The pump produces a pressure change in the conduit when the conduit is squeezed. A pressure-responsive control arrangement controls operation of the motor as a function of pressure changes in the conduit resulting from squeezing of the conduit due to the presence of an object caught between the conduit and the window when the latter is moving in closing direction.

16 Claims, 5 Drawing Figures

PATENTED APR 17 1973 3,727,348

SAFETY ARRANGEMENT FOR POWERED VEHICLE WINDOWS, SUN-ROOFS AND THE LIKE

BACKGROUND OF THE INVENTION

The present invention relates to safety arrangements for doors, windows and the like, and particularly for powered doors and windows.

More particularly, the invention relates to safety arrangements for powered vehicle windows, sun-roofs, and the like.

Power-driven vehicle windows and sun-roofs have long been known, and are characterized by certain disadvantages. In particular, it is known that motor-driven vehicle windows and the like present a safety hazard, in that the hands and fingers of vehicle passengers, especially children, are sometimes caught in a window being closed, and thereby injured, sometimes severely. Even deaths are known to have occurred in instances where a young child, playing with the controls, had his neck caught between the frame and the window pane.

Various attempts have been made to overcome this hazardous shortcoming of powered vehicle windows. It is known, for instance, to provide a safety arrangement which makes use of a squeezable fluid-filled tube extending along the upper portion of the vehicle window frame, and so positioned that as the window pane rises to close the window opening an object caught between the upper edge of the windowpane and the window frame will press against and squeeze the fluid-filled tube. Inasumch as a fixed quantity of fluid medium is present in the tube, the squeezing of the tube will result in an increase of pressure therein. Such safety arrangements are accordingly provided with pressure-responsive switch means which interrupt operation of the drive motor, and thereby interrupt closing of the window, when an object caught between window and frame presses against and squeezes the fluid-filled tube.

Various modifications of this type of safety arrangement exist, and each is characterized by shortcomings which greatly limit its practical value.

In one known arrangement, the fluid-filled tube is filled with air and sealed at both ends. When, during closing of the motor-driven window, and object is caught between window and frame, the air-filled tube will be pinched. The resulting decrease in volume of the sealed tube produces an increase of pressure, and when the pressure increase reaches a threshold value, a pressure-responsive switch arrangement will interrupt operation of the window drive motor. The great disadvantage of this arrangement is that squeezing of the air-filled tube even quite forcibly results in but a small change in pressure, leading to the requirement for pressure-responsive switch means having very great sensitivity. Such highly sensitive pressure-responsive switch means are, in the first place, expensive and somewhat delicate and, still more importantly, disadvantageously subject to changing environmental influences. Specifically, the pressure of the air sealed within the tube may change substantially, and even reach the threshold value solely for example as a result of changes in ambient temperature. Thus, in sunny weather or on hot days the temperature of the sealed air may increase to such an extent that the pressure within the tube will reach, and even substantially exceed, the the threshold value. Under such circumstances, it becomes impossible to close a window which has been opened, because the pressure-responsive switch means permanently prevents the drive motor from moving the windowpane. Such situation is clearly intolerable.

Conversely, in cold weather, the temperature of the sealed air may decrease to such an extent that even very forcible squeezing of the air-filled tube will not result in a sufficient build-up of pressure to activate the pressure-responsive switch means. This is particularly the case when the object caught between window and frame is small, for instance a child's finger, so that the air-filled tube is squeezed only along a small portion of its length. In such circumstances the safety arrangement will simply fail to operate.

SUMMARY OF THE INVENTION

It is accordingly an object of the invention to overcome these shortcomings of prior-art safety arrangements.

It is a further object of the invention to provide a safety arrangement for powered vehicle windows, sun-roofs and the like, which is highly reliable.

It is a more particular object of the invention to provide such a safety arrangement which is quickly responsive.

It is another object to provide an arrangement utilizing a fluid-filled tube and which responds even when the fluid-filled tube is squeezed only along a small portion of its length.

It is an additional object to provide such an arrangement whose operation is largely independent of temperature and other environmental influences.

It is a further object to provide such an arrangement which is characterized by a pressure threshold value which is higher than the pressure build-up which results upon temperature increase of the fluid in the fluid-filled tube.

It is yet another object to provide an arrangement in which the high pressure threshold value is reached quickly in response to squeezing of the fluid-filled tube, even when the tube is squeezed along only a small portion of its length.

It is a further object to provide an arrangement in which the possibility of slow leakage of pressure fluid does not greatly reduce the effectiveness of the system.

It is another object to provide an arrangement which is very simple and in which the pressure medium is air, and further in which the air is continually supplied from the ambient atmosphere, eliminating problems of sealing.

It is still another object to provide such an arrangement with advantageous switching means.

In pursuance of the above objects—and others which will become apparent hereafter—the novel safety arrangement for powered windows and the like comprises, in a vehicle, squeezable fluid conduit means at least in part bounding an opening, closure means movable in direction closing the opening, and motor means for moving the closure means. Advantageously, the arrangement includes pump means connected with the fluid conduit means for establishing a flow of fluid therethrough, the pump means producing a pressure change in the conduit means when the conduit means is squeezed. In addition, the arrangement includes pressure-responsive motor control means for controlling the operation of the motor as a function of pressure changes in the conduit means resulting from squeezing of the conduit means due to the presence of an object caught between the conduit means and the closure means when the latter is moving in the direction closing the opening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
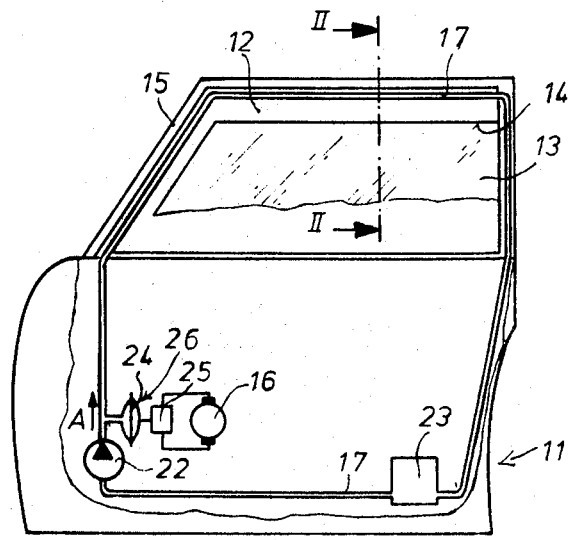
FIG. 1 is a somewhat schematic side view of a door, with the upholstery removed, of a vehicle provided with power windows and the safety arrangement according to an exemplary embodiment of the invention.
Figure 2:
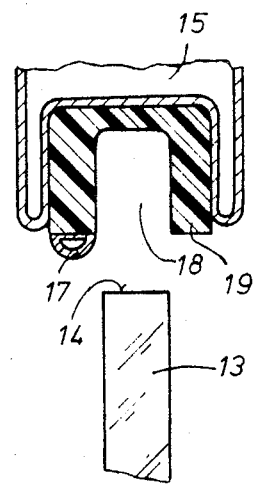
FIG. 2 is a sectional view taken on line II—II of FIG. 1, showing part of the window and window frame of the vehicle.
Figure 3:
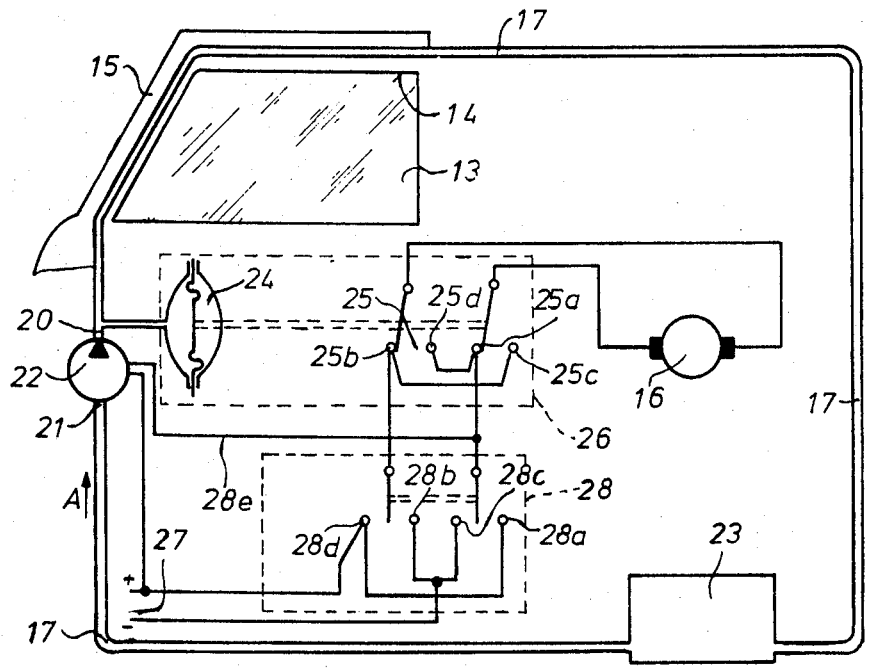
FIG. 3 is a schematic view of the vehicle door of FIG. 1, showing details of electric circuitry.

Discussing firstly the embodiment of FIGS. 1–3, it will be seen that FIG. 1 illustrates a vehicle door generally identified by numeral 11. Typically, the door comprises window frame portions 15 which define a window opening 12. Closure means, here in form of a slidable windowpane 13 is driven up and down by drive motor 16, to close and open window opening 12. Windowpane 13 has an upper edge 14 between which and frame portion 15 an object, such as the finger or hand of a passenger, may become caught during closing of the window. The embodiment of FIGS. 1–3 operates in such a manner that if an object is caught between windowpane edge 14 and frame portion 15 during closing of the window, drive motor 16 will thereupon be reversed, immediately causing windowpane 13 to descend.

Squeezable conduit means, here in form of a tube 17, bounds the upper portion of opening 12, extending along and fixed to the upper cross-bar of frame portion 15. FIG. 2 shows that tube 17 may advantageously be provided along the length of a rubber gasket 19, or the like, of the type usually provided for sealing purposes on the lower face of the cross-bar of frame 15-i.e., the face against which edge portion 14 of windowpane 13 presses when the window is closed. Advantageously, and as shown in FIG. 2, conduit means 17 has a cross-section which is narrower in direction of movement of windowpane 13 than transverse to such direction.

From FIG. 3 it can be seen that squeezable tube 17 has a first end portion 20 and a second end portion 21, and that end portion 20 is connected to the pressure side of a pump 22, whereas end portion 21 is connected to the suction side of that pump. Thus, in this embodiment, the squeezable tube 17 and pump 22 form a complete circuit for fluid flowing through the tube.

In the embodiment of FIGS. 1–3, pump 22 pumps fluid in the direction of arrow A when windowpane 13 is in the process of rising. Accordingly, when the tube 17 is squeezed, and thus blocked or partially blocked, by an object pressed between the windowframe and the edge 14 of rising windowpane 13, a very substantial increase of pressure will quickly develop in the tube between pump 22 and the squeezed portion of tube. A pressure sensing device 24, here in the form of a membrane-type pressure sensor, communicates with the fluid circuit formed by tube 17 and is quickly responsive to the substantial pressure increase which results upon squeezing of a portion of the tube. Pressure-sensing device 24 is mechanically coupled to switch means 26 which, in this embodiment, comprises a pole-reversing switch 25. Device 24 and pole-reversing switch 25 together form part of pressure-responsive motor control means for controlling the operation of motor 16 as a function of pressure changes in conduit 17. Accordingly, if during closing of the window the tube 17 is squeezed by an object caught between windowpane and frame, the pressure sensed by device 24 will quickly reach the threshold value, because of the operation of pump 22 during closing of the window. The threshold value of pressure having been reached, pole-reversing switch 25 is activated to reverse the direction of drive motor 16, immediately causing windowpane 13 to descend, until such time as the squeezing of tube 17 terminates—i.e., until such time as the object caught between frame and windowpane is withdrawn. When the squeezing of tube 17 terminates, the pressure in tube 17 will be relieved, resulting in a decrease below threshold value of the pressure sensed by device 24, and thus a pole-reversal by means of switch 25. Thus, when the object caught in the window has been withdrawn, closing of the window will resume.

Specifically with regard to the circuitry shown in FIG. 3, it will be seen that motor 16 receives electrical energy from source terminals 27. At the same time, in this embodiment, source terminals 27 are connected to the motor (not separately illustrated) which drives pump 22. Pole-reversing switch 28 is accessible to the occupants of the vehicle passenger compartment and affords control of the electrically operated window. Pole-reversing switches 25, 28 will normally be in the positions shown in FIG. 3. Accordingly both the drive motor 16 for the windowpane and the motor (not separately illustrated) for pump 22 will be disconnected from source 27.

When the moving contacts of switch 28 contact terminals 28b and 28a —i.e., when the switch is pushed to the right in FIG. 3—the motor 16 will be driven in a sense causing lowering of windowpane 13. At the same time, both terminals of the motor for pump 22 will be connected to the positive terminal of source 27, so that the terminal voltage of the pump motor will be zero. Accordingly, as the windowpane is being lowered, the pump will not operate.

When now the moving contacts of switch 28 contact terminals 28d and 28c—i.e., when the switch is pushed to the left in FIG. 3— the motor 16 will be driven in a sense causing raising of windowpane 13. In this position of switch 28 the motor for pump 22 will be connected to the source, and thus driven. The fluid circuit formed by tube 17 will now be in readiness for the quick development of substantial pressure increases in response to squeezing of the tube. Indeed, when the tube is completely pinched off, so that no fluid flows at all, the pressure will build with a force equal to the pumping force of pump 22.

Further with regard to the embodiment of FIGS. 1–3, it will be seen that the fluid circuit formed by tube 17 contains an enlargement or pressure cushion chamber 23. When the safeguard system of this embodiment is idle, the pressure cushion within chamber 23 will prevent the downward flow of pressure fluid thereinto. If pressure fluid were allowed to descend in the circuit during idling of the system an undesirable increase of overall response time would result. The system would not be ready to quickly develop substantial pressure increases until after a certain amount of pressure fluid has been pumped into the portion of tube 17 extending across the top of window opening 12. By provision of pressure cushion means 23, however, the conduit will be substantially filled with fluid even when not operating. Likewise, the arrangement of FIGS. 1–3 is advantageous, in that the pump need be driven only for very short periods—i.e., only when a window is being closed— so that the energy consumption associated with the pump need not be great.

The pressure fluid employed in the system according to FIGS. 1–3 is preferably a liquid which is highly temperature and light resistant and which is in addition chemically resistant.

Advantageously, the tube 17 is made of colorless— i.e., transparent, translucent or achromatic— material. Such choice of material serves to make the tube 17 less aesthetically obtrusive and may be of benefit in reflecting the sun's rays, if such factor is to be taken into account.

Figure 4:
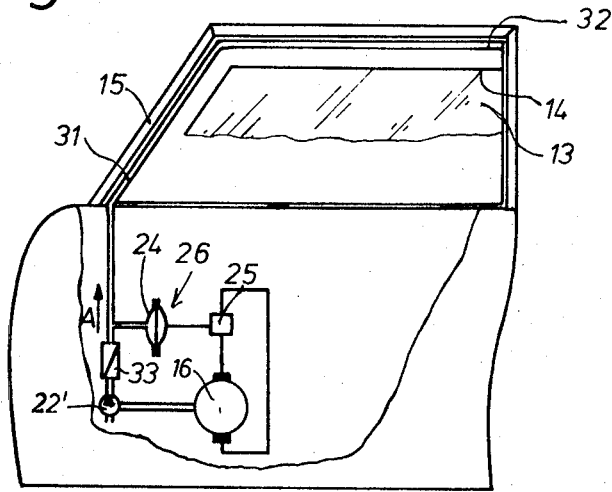
FIG. 4 is a view similar to FIG. 1, but illustrating a safety arrangement according to another exemplary embodiment of the invention.
Figure 5:
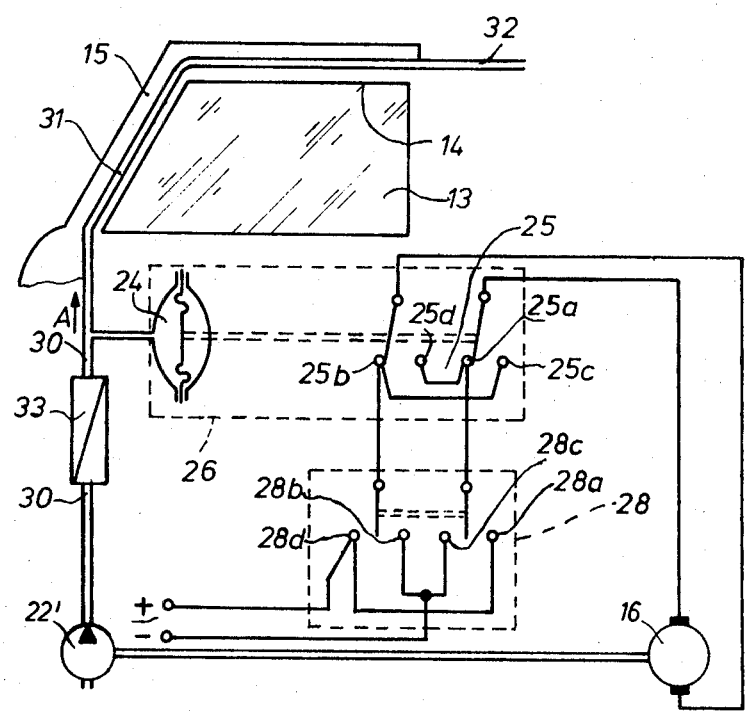
FIG. 5 is a schematic view of the vehicle door of FIG. 4, showing details of electric circuitry.

A simpler version of the invention is disclosed in the embodiment of FIGS. 4 and 5, in which atmospheric air is employed as the pressure fluid. The embodiment of FIGS. 4–5 is simpler than that of FIGS. 1–3 in that good sealing of a closed circuit is not necessary, and further in that the pump 22' is driven by the same motor 16 which drives the windowpane 13.

Specifically with regard to FIG. 5, it will be seen that, as before, a squeezable tube— here identified by numeral 32— bounds a portion of a window opening. Unlike the previous embodiment, however, a complete circuit for the flow of pressure fluid is not provided. Instead, one end of tube 32 is connected with the pressure side of pump 22', whereas the other end of tube 32 communicates with the atmosphere. The operation of this system is similar to that of the one already described. Specifically, activation of switch 28 causes motor 16 to raise windowpane 13 and drive pump 22', so that air flows through squeezable tube 32 in the direction of arrow A. If an object, such as the hand or finger of a passenger, becomes caught between frame 15 and rising windowpane edge 14, the tube 32 will be squeezed. The resulting blockage or partial blockage of the air flowpath defined by tube 32 leads to an immediate and very substantial increase of air pressure in the conduit, between the pump and the pinched portion of tube. This pressure build-up activates membrane-type pressure sensor 24 which in turn activates pole-reversing switch 25, as in the embodiment previously discussed. Accordingly, squeezing of tube 32 during closing of the power window will immediately cause motor 16 to lower windowpane 13, as before.

Inasmuch, now, as motor 16 in this embodiment also drives pump 22', certain special problems are created with respect to to flow of air. Specifically, when in response to pinching of tube 32 motor 16 causes windowpane 13 to lower, the motor will simultaneously cause a reversal of the pumping direction. This quickly leads to a decrease of pressure in the conduit portion between the pump and the pinched portion of tube, and thus to a termination of the safeguarding action. To prevent this circumstance from occuring, a check valve or the like 33 is provided in the pneumatic circuit between the pump and the section of tube subject to pinching. When, now, windowpane 13 descends as a result of pressure build-up in tube 32, reverse-acting pump 22' will be prevented from counteracting the pressure build-up, and undesirably destroying the safeguarding effectiveness.

It will be appreciated that the invention, as reflected in the aforedescribed two exemplary embodiments, represents a considerable advance over the prior art. The provision of pump means renders the system quickly and decisively responsive. Likewise, the pump means permits the use of a very substantial pressure threshold value, thus eliminating the need for highly sensitive pressure sensors, and eliminating also the influence of temperature fluctuations and other environmental changes. Furthermore, because a considerable pressure build-up develops almost immediately, the system responds even when the fluid-filled tube is squeezed only along a small portion of its length.

According to the invention, slow leakage of pressure fluid will not materially affect the responsiveness of the system, since the pressure build-up is not dependent on maintaining a fixed, predetermined amount of fluid in the circuit. In the first embodiment described, the pressure build-up results from the pumping action, and in the second embodiment described, small fluid leaks result in almost no loss of effectiveness, since a closed system is not involved. Thus, the problem of sealing is very greatly simplified.

Whereas only two embodiments have been illustrated, it should be understood that many modifications are possible. For instance, it is possible to have a fluid-filled sealed system as in FIGS. 1–3, where however the windowpane and pump are driven by the same motor as in FIGS. 4–5, a check valve being provided if necessary as shown in the latter Figures.

Conversely, it is possible to provide a system which communicates with the atmosphere and which employs ambient air as pressure medium, as in FIGS. 4–5, where however a separate motor drives the pump, as in FIGS. 1–3.

Likewise, whereas the safeguarding action in both disclosed embodiments results from a pressure build-up in the conduit system, it is possible also to operate on the basis of pressure drops. Thus, in the embodiment of FIGS. 1–3 the pumping direction could be reversed. In that case, pinching of tube 17 would result in a rapid and substantial pressure drop which could trigger a pressure sensor working contrary to illustrated sensor 24.

In the embodiment of FIGS. 4-5, too, the safeguarding action could equally well result from the development of pressure drops. If the pumping direction were reversed, then pinching of tube 32 would result in a quick and substantial pressure drop which could be sensed by a sensor such as sensor 24 which, however, works in opposite sense. In such event, the direction of check-valve action, too, would have to be reversed.

Continuing, it is emphasized that the provision of the check valve in FIGS. 4-5 is but one exemplary expedient. When in FIG. 5 the reversed pump begins to counteract the activating pressure build-up, the counteraction can be prevented without the use of check valves, for example through the use of a by-pass conduit arrangement, or the like.

In addition it is noted that whereas in the disclosed embodiments the safeguarding action involves motor reversal, i.e., lowering of a windowpane which was being raised, other forms of control are possible. It is possible, for example, simply to terminate operation of the motor, or even to reduce the force with which the motor drives the windowpane.

It will be understood that each of the elements described above, or two or more together, may also find a useful application in other constructions differing from the types described above.

While the invention has been illustrated and described as embodied in a safety arrangement for powered vehicle windows, sun-roofs and the like, it is not intended to be limited to the details shown, since various modifications and structural changes may be made without departing in any way from the spirit of the present invention.

We claim:

1. In a vehicle, a safety arrangement for powered windows, sun-roofs, and the like, comprising squeezable fluid conduit means at least in part bounding an opening; closure means movable to and from a position in which it closes said opening; pump means connected with said fluid conduit means for establishing a flow of fluid therethrough, said pump means producing a pressure change in said conduit means when said conduit means is squeezed; motor means for moving said closure means; and pressure-responsive motor control means for controlling the operation of said motor means as a function of pressure changes in said conduit means resulting from squeezing of the latter due to the presence of an object caught between said conduit means and said closure means when the latter is moving to said position.

2. The arrangement of claim 1, wherein said pump means has a pressure side and a suction side, and wherein said conduit means has a first end connected to said pressure side and a second end connected to said suction side.

3. The arrangement of claim 1, wherein said pump means has a pressure side and a suction side, and wherein said conduit means has a first end connected with one of said sides and a second end communicating with the atmosphere.

4. The arrangement of claim 3, wherein said first end is connected with said pressure side.

5. The arrangement of claim 2; and further comprising pressure cushion means connected with said conduit means.

6. The arrangement of claim 1, wherein said fluid is stable with respect to environmental changes.

7. The arrangement of claim 1, wherein said fluid is chemically inert.

8. The arrangement of claim 1, wherein said fluid conduit means comprises a squeezable tube.

9. The arrangement of claim 1, wherein said fluid conduit means comprises conduit portions of colorless material.

10. The arrangement of claim 1; wherein said fluid is gaseous.

11. The arrangement of claim 1; and further comprising frame means bounding said opening, said squeezable fluid conduit means being at least in part mounted on said frame means.

12. The arrangement of claim 1; and further comprising check means provided in said conduit means.

13. The arrangement of claim 1, wherein said motor means for moving said closure means also drives said pump means.

14. The arrangement of claim 1, wherein said conduit means has a cross-section which is narrower in direction of movement of said closure means than transverse to said direction.

15. The arrangement of claim 1, wherein said control means comprises switch means connected with said motor means.

16. The arrangement of claim 15, wherein said switch means comprises pole-reversing switch means.

* * * * *